June 6, 1939.   G. CARWARDINE   2,161,334
SPRING-CONTROLLED MECHANISM
Filed Aug. 19, 1936   8 Sheets-Sheet 3
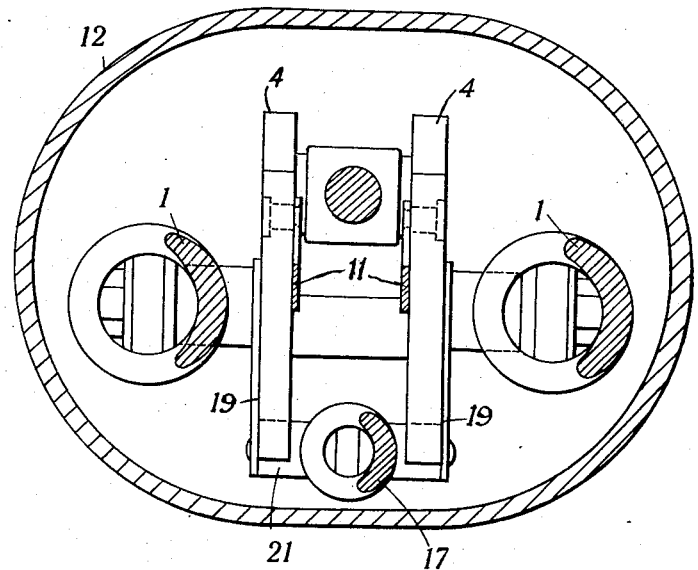
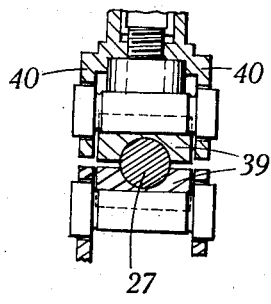
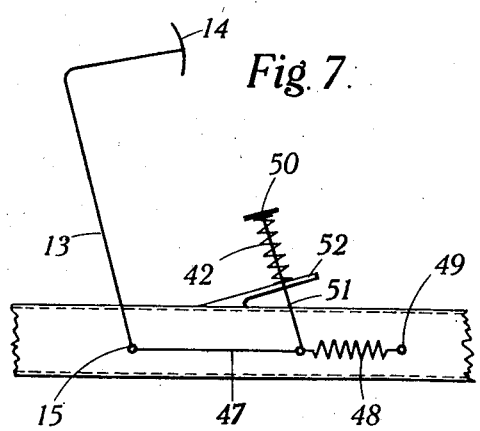
INVENTOR.
G. CARWARDINE.
By ......
ATTYS.

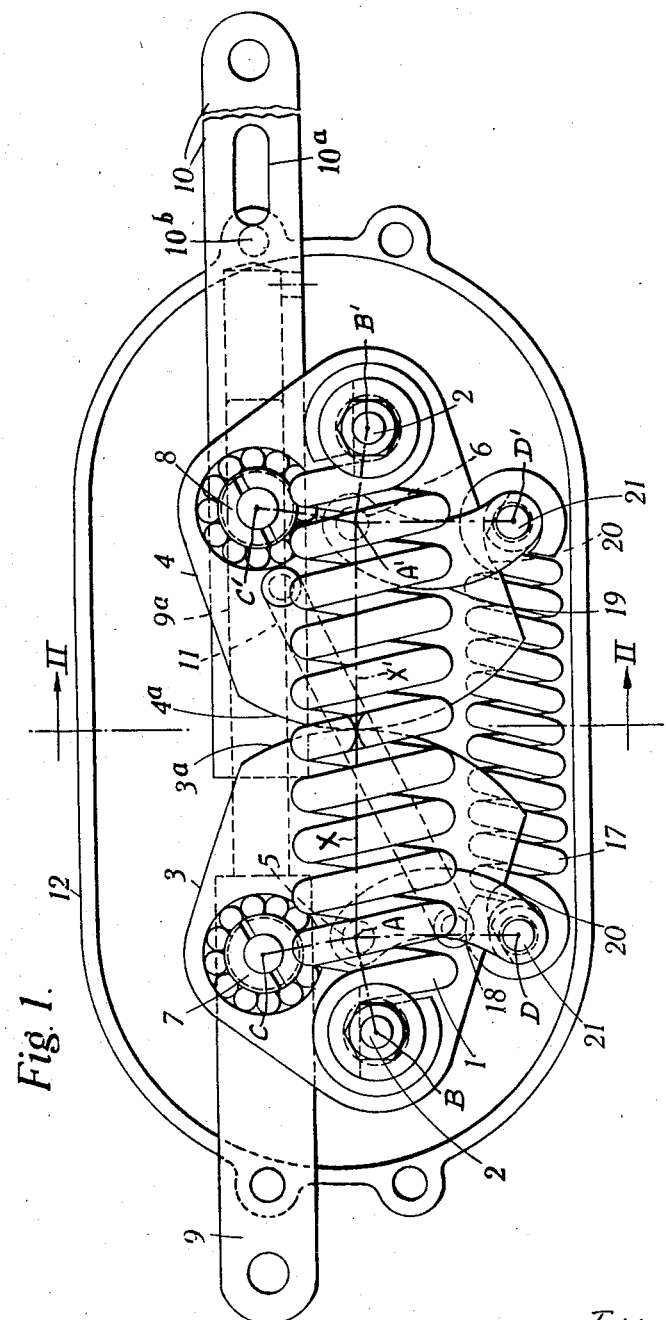

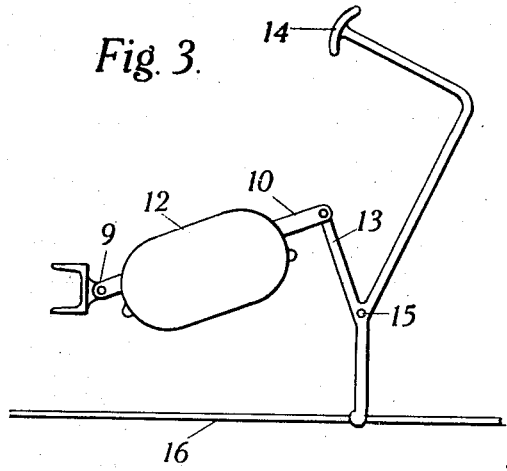
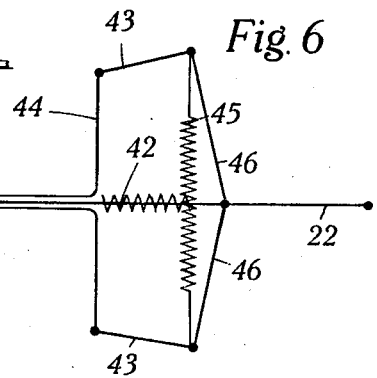
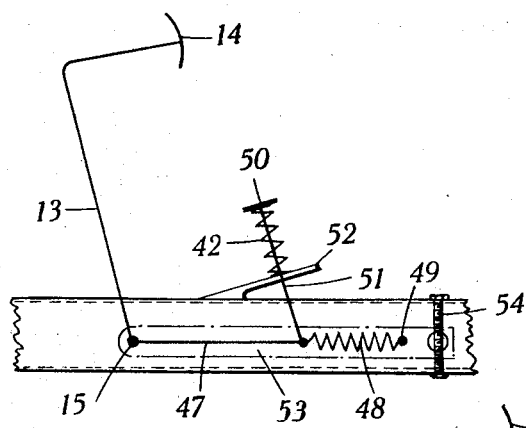
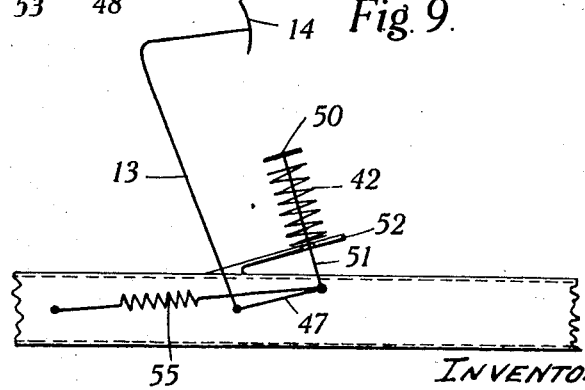

June 6, 1939.  G. CARWARDINE  2,161,334
SPRING-CONTROLLED MECHANISM
Filed Aug. 19, 1936   8 Sheets-Sheet 7
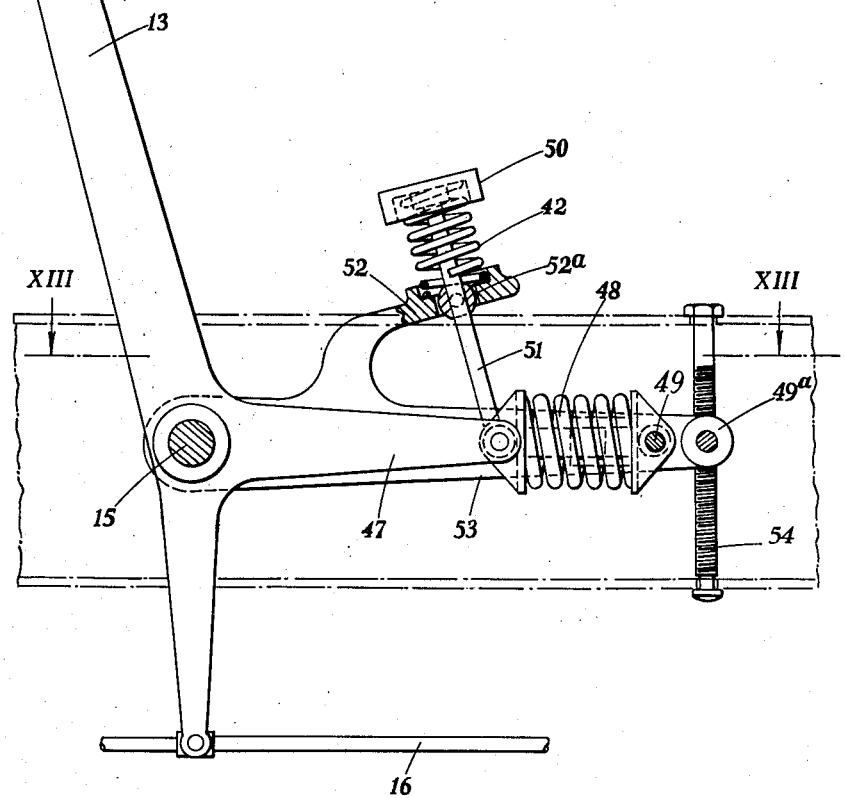
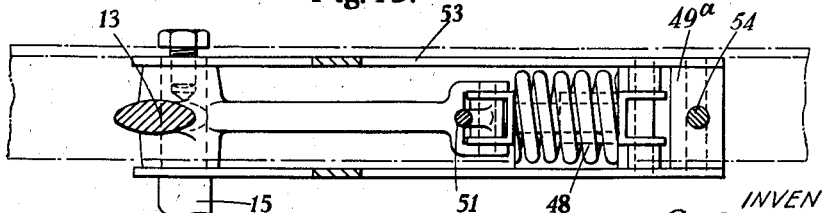
INVENTOR
G. Carwardine
BY
ATTORNEYS June 6, 1939. G. CARWARDINE 2,161,334
SPRING-CONTROLLED MECHANISM
Filed Aug. 19, 1936 8 Sheets-Sheet 8
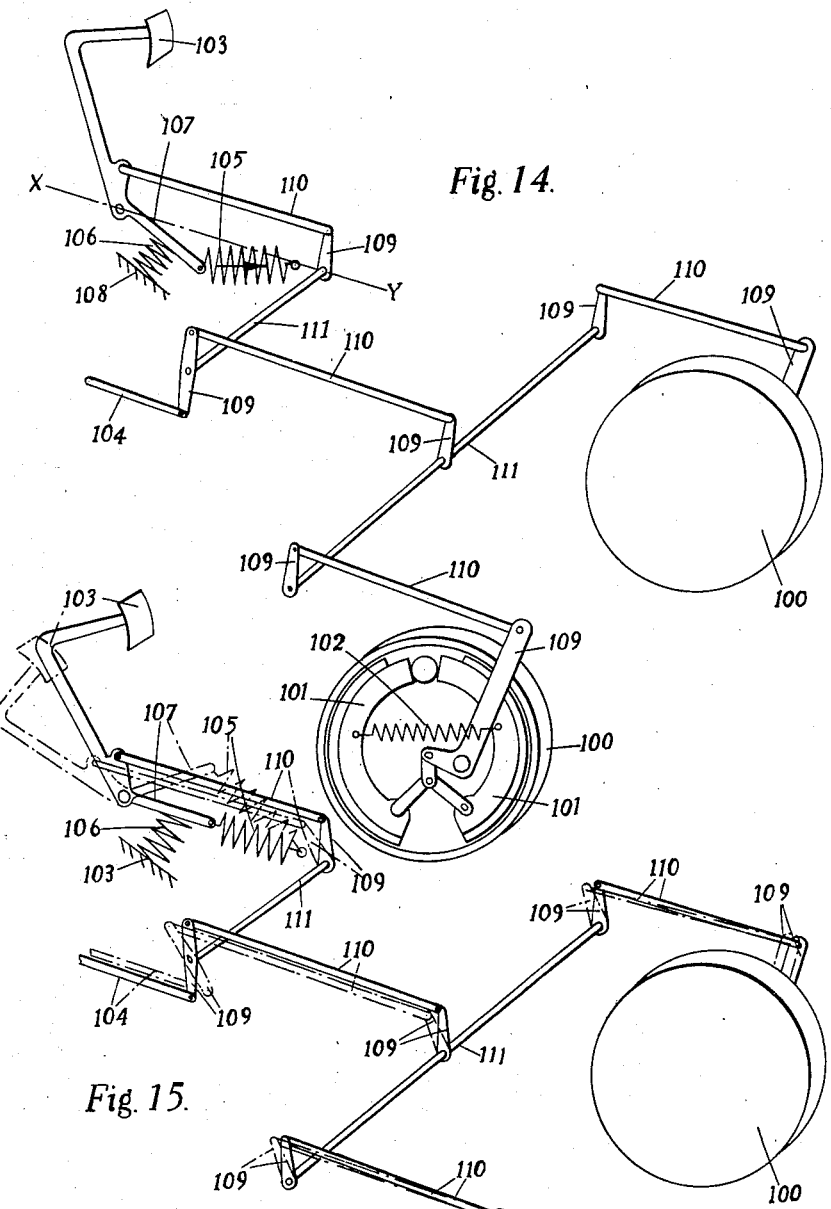

Patented June 6, 1939

2,161,334

UNITED STATES PATENT OFFICE 2,161,334

SPRING-CONTROLLED MECHANISM

George Carwardine, Bath, England, assignor of one-third to Herbert Terry & Sons Limited, Redditch, England Application August 19, 1936, Serial No. 96,864
In Great Britain August 24, 1935

14 Claims. (Cl. 188—167)

This invention relates to mechanism in which the falling force characteristic of a relaxing spring or the like is converted into a rising force effort for the purpose of wholly or partly overcoming an increased resistance of which an example is that met with when applying the brakes of motor or other vehicles. In such a mechanism a spring or like elastic member may be connected to a movable member in such a way as to exert a turning moment, the arm of which increases as the movable member moves away from a dead centre position. Instead of the movable spring-controlled member being a pivoted lever or the equivalent, the member may be a strut which is equally capable of being subjected to the action of the spring or like member on either side of a dead centre position. In this case, any movement to one side or the other of that position will allow the strut to extend under the action of the spring or other elastic member, whereupon the spring can exert a force in a line which is at an angle to the line of action of the spring when in the dead centre position.

In many applications of either of these kinds of devices, the effort produced by the spring can conveniently only be used when produced on one side of the dead centre position. Thus, in the case of a vehicle brake, if when the brake is applied the spring acts on one side of the dead centre position to assist the application of the brake, then when the brake is released and the spring taken over to the other side of the dead centre position, it cannot be usefully employed on that side because it tends to retract the brakes and its force has to be overcome before the brake can be re-applied.

Thus the object of the present invention is to take up or oppose the effort produced by the spring or like device when the latter is acting on that side of its dead centre position on which the effort is not required for useful purposes.

With this object in view, according to the invention, a secondary compensating spring or other elastic member or members is provided in addition to the main spring or springs which act on the member which consists of a pivoted lever or strut and this secondary elastic member is so disposed that it opposes or takes up the effect of the main spring or springs when the lever or strut is moved to the side of its dead centre position in which the action of the main spring or springs is not required to be utilized. The connection of the secondary spring or springs is such, however, that when the main spring is changed over to that side of its dead centre position in which it is usefully employed, the secondary spring has no effective action on the main mechanism.

When the main spring or springs are attached to a pair of levers, the effective arms of which increase as the movements of the levers from their dead centre position increase, the secondary elastic member or members may then be arranged to act upon further pivoted arms with which the levers come into contact, so as to strain the secondary elastic member when the levers are moved to the side of their dead centre position in which they are not really required to be effective. When they pass over to the effective side of their dead centre position, of course, they leave the pivoted arms which therefore no longer act upon the levers.

When the spring-controlled main member consists of struts which are extendible under the action of springs, it may be arranged that the struts are pivoted and bear on a longitudinally movable or sliding member so as to be at right angles to the axis of movement when in their dead centre positions. If such a mechanism is applied to the braking system of a vehicle, when the brake is applied, the struts are drawn over to one side of their dead centre position and exert a resultant thrust along the line of movement of the moving member, assisting in the application of the brakes, but in this case also by the nature of things, if the struts are moved over to the other side of their dead centre position, which in practice actually must happen when the brakes are retracted, it cannot be avoided that the struts exert a thrust along the line of movement of the moving member in the opposite direction. In this case, the secondary spring or elastic member is used to counteract the last-mentioned thrust.

In order that the invention may be clearly understood and readily carried into effect, some examples of mechanisms in accordance therewith will now be described more fully with reference to the accompanying drawings, in which:—

Figure 1 is a front elevation of one form of mechanism with the cover of the casing removed;

Figure 2 is a cross-section of Figure 1 on the line II—II in Figure 1;

Figure 3 is a diagram showing the application of the mechanism shown in Figures 1 and 2 to the brake gear of a motor car;

Figure 5 is a vertical section of the upper half of Figure 4 taken on the line V—V in that figure;

Figures 6 to 9 are diagrammatic illustrations of somewhat modified forms of the mechanism shown in Figures 4 and 5.

Figure 12 is a part-sectional side elevation of the mechanism shown diagrammatically in Figure 8;

Figure 13 is a cross section substantially on the line XIII—XIII in Figure 12; and Figures 14 and 15 are diagrammatic perspective views used in explaining the operation of the mechanisms shown in Figure 1 to 13.

Figure 1A:
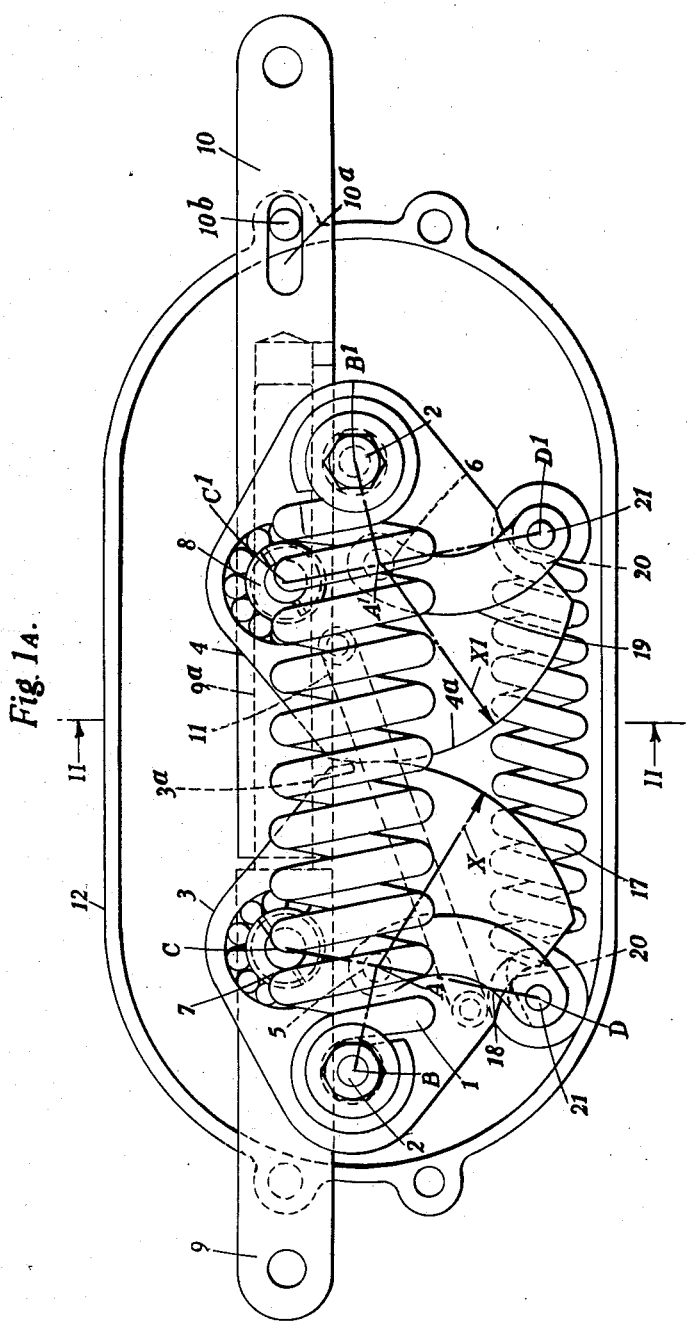
Figure 1a is a view similar to Figure 1 but showing the parts within the casing in a different phase of their operation.

In Figures 1 and 2, there are two main springs 1 anchored at their opposite ends to pins 2 extending from plates 3, 4 having surfaces 3a, 4a which define arcs about centres A, A' so that the rolling of the surfaces upon each other causes the plates 3, 4 to rotate about the axes A, A'. Thus, these plates with the pins 2 are the equivalent of a pair of levers which pivot about the axes A and A' and arranged so that the tension of the springs 1 tends to turn the levers in opposite directions. As can be seen in Figure 2, each of the plates 3, 4 consists of a pair of plates spaced apart, pivoted by means of ball bearings on members 7, 8 which also serve as the means of connection of rods 9, 10. The plates 3, 4 forming the pair of levers are connected together by links 11 so that they are constrained to turn through equal angles at all times as the arcuate surfaces 3a, 4a roll on one another. Arrows X, X' indicate the radii of the arcuate surfaces. The rods 9 and 10 are kept in line by an extension 9a of the rod 9 telescoping in a bore in the rod 10 and the rod 9 is fixed to the stationary casing 12. Thus, as the plates 3 and 4 are caused to roll on each other, turning respectively about the axes A and A', by pulling on the rod 10, the axes A and A' themselves swing respectively counter-clockwise and clockwise about the axes C and C' of the cross members 7 and 8. Nevertheless, the axes A and A' always remain the same distance apart.

The arrangement of the mechanism on a motor car is shown diagrammatically in Figure 3, where the casing 12 and the rods 9 and 10 appear. The rod 10 is connected to a convenient part of the brake applying linkage 13 so that when the brake pedal 14 is depressed, the linkage rocks about the pivot 15 and through the rod 16 applies the front and rear brakes and draws the rod 10 to the right.

The result of drawing on the rod 10 is thus to apply the brakes. The initial position of the parts in the casing 12 is substantially as shown in Figure 1a and just about at the time that the brake pads begin to be applied, the line joining the centers B, B' of the anchor pins 2 passes through the pivotal points A, A' of the two levers. As application of the brake continues, the levers are rocked so that the pins 2 move to the opposite side of the line joining the centers of the pivots A and A' into the position shown in Figure 1, whereupon the main springs 1 tend to draw the pins 2 together and as the member 7 to which the lever 3 is pivoted is stationary, this results in a movement of the rod 10 assisting the driver in applying the brakes. This moment exerted by the springs 1 and assisting the brake applying effort exerted by the driver's foot increases as the levers continue to move.

The positions of the members 7 and 8, the anchor pins 2 and the axes A and A' are so chosen that a line (in a plane at right angles to the axes A and A') passing through the axis C of the member 7 and through the axis A is at right angles to a line (in the same plane) passing through the axis A and the centre B of the associated anchor pin 2. Further similar lines through the axis C' of the member 8 and the axis A' and through the axis A' and the centre B' of the associated anchor pin 2 are at right angles. These pairs of imaginary lines CA, AB and C'A', A'B' are indicated by chain lines in Figure 1 and it is to be noted that CA and C'A' are equal, and that AB and A'B' are equal. CA is perpendicular to AB and C'A' is perpendicular to A'B' in all positions of the mechanism (Figures 1 and 1a). Now the springs 1 have the characteristic of exerting a force which is proportional to their extensions and are arranged so that when their axes are perpendicular to their levers, that is to the lines AB and A'B', the springs are just unextended. This means that the springs 1 are extended the maximum amount when they are in their dead centre positions with the pivot pins 2 in alignment with the axes A and A' and that they are arranged to contract when they are assisting the application of the brakes in such a manner that provided they are able to reach the position in which their axes are at right angles to their levers, they will arrive at their non-extended condition in which they exert no force just at the instant when they reach this position. Now, if the spring is in its dead centre position just when the brake pads make contact with their rims and all the slack in the brake mechanism has been taken up, the further movement of the springs 1 downwards as seen in Figure 1 results in the straining of the parts of the brake mechanism. Assuming that the brake mechanism obeys Hooke's law so that the resistance is proportional to the aforesaid straining, it is possible for the springs 1 exactly to balance the resistance due to the straining of the brake mechanism throughout the entire range of the springs 1 when the latter are on the brake applying or effective side of their dead centre positions. In other words, the falling force effort of the contracting springs exactly balances the rising force effort due to the straining of the parts of the brake mechanism. This state of equilibrium is possible in the construction shown in Figure 1 when the springs 1 and the various pivots are arranged exactly in the manner set forth above. In some cases it may be desirable for the falling force effort of the springs to have some other dimension and this may be provided for by arranging the springs so that they would reach their unstretched state either before or after their axes reach the position in which they are at right angles to lines AB and A'B'.

When the brake pedal 14 is released, the springs 1 are overpowered as a result of the release of the strain in the parts of the brake mechanism and the retracting springs and just before the brakes cease to be applied, the line of action of the springs 1 will again be in the dead centre position passing through the centers A and A'. At the next stage of movement, this line of action through the centers of the pins 2 will pass to the other side of the dead centre, that is to say, above the line joining the centers A, A' as seen in Figure 1, and consequently the springs 1 will exert moments on the levers 3 and 4 in the opposite direction, which moments would be transmitted as an upward thrust on the driver's foot through the brake pedal 14.

The subsidiary spring is a tension spring 17 anchored to two levers 18, 19 pivoted about pins 5, 6 which are coaxial with the axes A and A'. When the main springs 1 are on the brake applying side of the dead centre as shown in Figure 1, these subsidiary levers 18, 19 are not in contact with the main levers 3, 4. As soon, however, as the levers 3, 4 reach the position in which the springs 1 are in the dead centre position, notched portions 20 on the lower side of the main lever plates 3, 4 encounter cross pins 21 extending between the plates which constitute the levers 18, 19 so that the levers 18 and 19 are caused to participate in the movement of the main levers 3 and 4 with the result that the subsidiary spring 17 is then stretched (Figure 1a). The tension in the spring 17 increases as the movement away from the dead centre position continues, and it may be adjusted so that it balances or substantially balances the moment of the main springs 1 upon the two main levers 3, 4 so that when the driver commences to depress the brake pedal 14 again, he does not have to exert sufficient force to overcome the whole tension of the springs 1. The spring 17, which obeys Hooke's law (i. e. always exerts a force which is directly proportional to the load upon it) may be so chosen and arranged that it exactly balances the springs 1 in all positions within the range of movement of the springs 1 on the side of the dead-centre position remote from the brake-applying side thereof. In this case, when the brakes are being released, the spring 17 remains completely unstressed until the springs 1 reach the dead-centre position. When that position is reached the notched portions 20 engage the pins 21 and the positions of the levers 18 and 19 are such that the lines AB and A'B' are perpendicular respectively to the lines AD and A'D', where D and D' are the axes respectively of the two pins 21. Upon further movement of the springs 1 beyond the dead-centre position these pairs of lines remain perpendicular (see Figure 1a) because the notched portions 20 cause the pins 21 to move as if integral with their respective plates 3 and 4, and the spring 17 is stretched. The movement ceases when the springs in the brake drums have fully withdrawn the brake pads from their rims. Then, when the brakes are again applied, the rod 10 is pulled to the right (as viewed in Figure 1a) so that, as the plates 3 and 4 are swung respectively anti-clockwise and clockwise, the springs 1 are stretched until they reach their dead-centre position, the force due to the springs 1, which would tend to prevent the driver from pulling the rod 10 to the right, being balanced by the relaxing spring 17. The latter ceases to act as the springs 1 pass the dead-centre position because, when that position is reached, the spring 17 is completely relaxed so that there is no tendency for it to cause the levers 18 and 19 to follow the plates 3 and 4 further. The springs 1, having passed the dead-centre position, now assist the driver in moving the rod 10 and applying the brakes. The aforesaid springs in the brake drums are stretched until the brake pads engage their rims. This occurs substantially at the point where the springs 1 pass over the dead-centre position. Thereafter, the relaxing springs 1 assist the driver in straining the linkage between the pedal 14 and the brake shoes so as to increase the pressure between the braking surfaces.

In order to facilitate the fitting of the mechanism shown in Figures 1 and 2 to a motor vehicle, a slot 10a is formed in the rod 10 and a hole 10b is formed in a lug on the casing 12. Before fitting the mechanism to a vehicle, a straight pin, passing through the slot 10a is screwed into the hole 10b. The slot is so located that when its left hand end bears against the pin, the springs 1 are in their dead centre positions. The springs 1 are, however, free to move upwards as seen in Figure 1 from their dead centre positions, with the slot 10a moving relatively to the pin. During this movement, the springs 1 are, of course, balanced or substantially balanced by the subsidiary spring 17. When the mechanism has been fitted to the vehicle, the pin is removed. The function of the slot 10a and hole 10b is simply to receive this pin which prevents the mechanism from going over to the brake-applying side of the dead-centre when the mechanism is being fitted to a vehicle as indicated above, the springs 1 are shown in Figure 1 on the brake applying side of the dead centre position, and in Figure 1a on the other side of the dead centre position.

Figure 4:
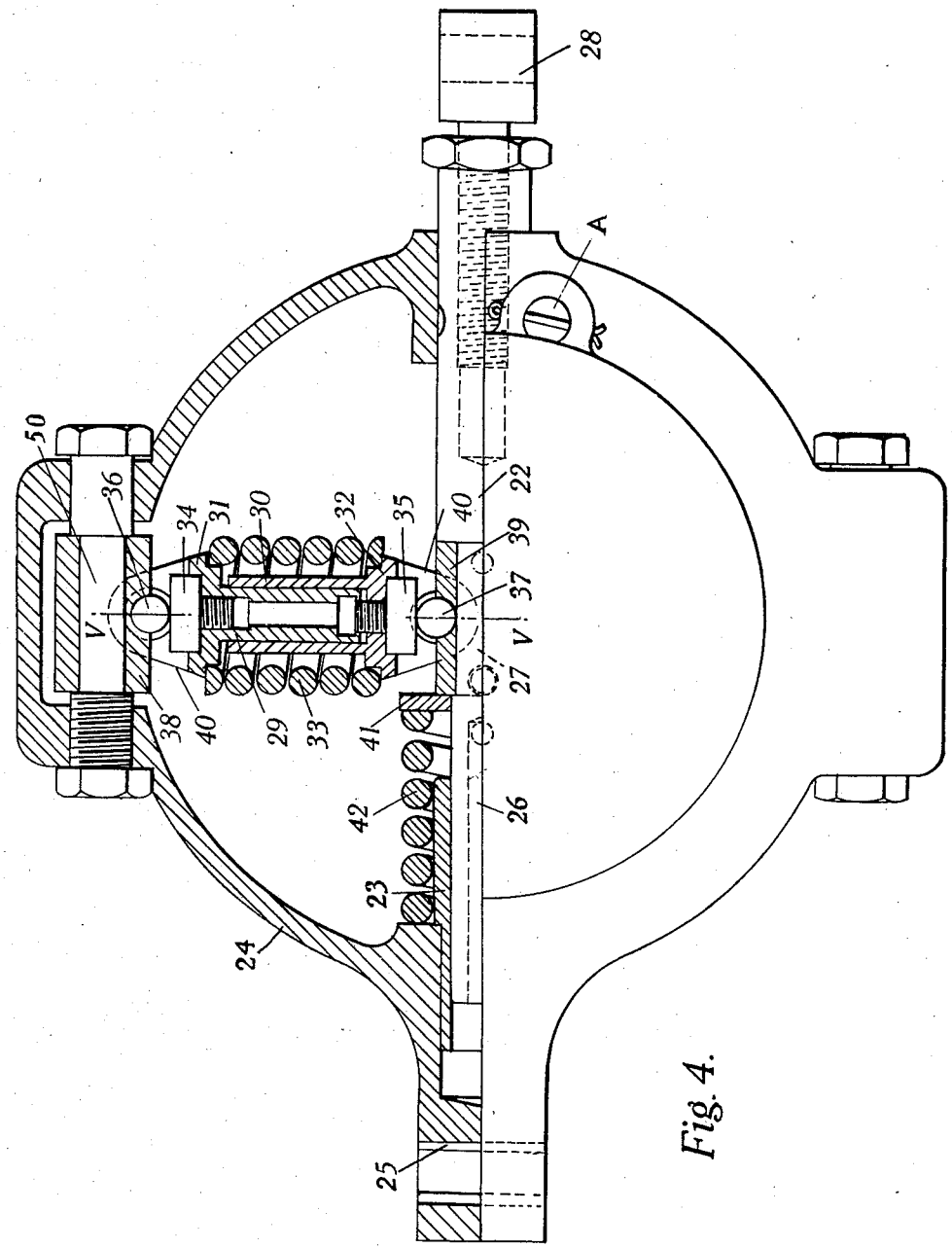
Figure 4 is a front elevation with the upper half in central section of a modified form of elastic mechanism in accordance with the invention.

In the form of construction illustrated in Figures 4 and 5, a slidable member 22 is arranged to slide co-axially within a bore in a member 23, fitted to a forked casing 24, the casing 24 being pivoted at 25 at its outer end to the frame of the vehicle. The member 22 consists of a cylindrical rod having its forward end 26 of such a size as to fit within the member 23 and having a reduced part 27 next to the part 26. The member 22 at its outer end is pivoted at 28 to the free end of the lever either integral with or securely fixed to the brake pedal or operating gear of the motor car.

Between the ends of the forked parts of the casing 24 and opposite points on the part 27 of the moving member 22 are pivoted two opposed extendible spring-loaded struts (only one of which is seen in Figure 4) which exert opposing forces towards the common axis of the members 22, 23. Each of the said extendible struts, of which the upper one is seen clearly in Figures 4 and 5, comprises two co-axially sliding parts 29, 30 having opposing shoulders 31, 32 against which a compression spring 33 abuts. The outer ends of the parts 29, 30 are provided with hardened heads 34, 35, the outer surfaces of which are plane normal to their common axis and which are arranged to press against hardened steel cylindrical members 36, 37 whose axes are normal to the plane of movement and are located respectively on the fixed casing 24 and the moving member 22. The cylindrical members 36 and 37 rest respectively in semi-cylindrical grooves in members 38 and 39. The member 38 is arranged to pivot about a pin 50 carried by the casing 24. The member 39 is formed in two halves to encircle the part 27 of the rod 22 and its outer surfaces form a square in cross-section, the opposite faces having the grooves to receive the members 37. This construction allows the struts to be articulated so as to rock with negligible friction, the hardened surfaces of the members 34 and 35 merely rolling around the respective cylindrical members 36, 37. In order that such rolling may be confined to a limited area of the surfaces of the heads 34, 35, ears 40 are provided at the outer ends of the struts and these are shown provided with clearance holes through which the cylindrical members 36, 37 pass. The clearance is sufficient to allow the required degree of rolling to take place. Moreover, to allow for inaccuracy of machining and at the same time to ensure even contact between the members 36 and 37 and the plane surfaces of the heads 34 and 35, the members 36 and 37 are given freedom to float about axes parallel to the common axis of the members 22 and 23. Thus, the member 38 together with the cylindrical member 36 can float around the pin 50. Also the two halves of the member 39 together with the cylindrical members 37 can float around the axis of the member 22. Relative movement between the two halves of the member 39 is allowed for by providing a clearance (seen in Figure 5) between the two halves of the member 39. As already indicated, the member 24 is extended to form a protective case and, if desired, the said case 24 may be bolted to the frame of the vehicle and the member 22 connected at 28 to the brake mechanism of the vehicle.

In order that the action at the joints provided by the heads 34 and 35 and their respective cylindrical members 36 and 37 may be fully understood, it must be stated that the maximum angular displacement between the axis of the strut and a line through the centres of the cylindrical members 36 and 37 will not exceed the clearance shown between the cylinders and the holes in the ears 40. In fact, the design is such that the angle between these two lines will not exceed $\tan^{-1} 0.05$ (approximately 3 degrees). This is considerably less than the angle of repose between a fixed hardened cylinder of the size shown and a plane surface, having regard to the very high unit pressure involved in linear contact. Clearly, unless the angle of repose is exceeded, the struts can only articulate in a pure rolling sense. In considering this it must be borne in mind that the aforementioned angle is not the same as the angle which the strut can take up with respect to a vertical line when the mechanism is in operation. The point is that for all angular positions of the strut the axis of the latter can never move more than a little out of alinement with the line joining the centres of the cylinders 36 and 37.

Clearly when the axes of the extendible struts 29, 30 are at right angles to the axis of the members 22 and 23, the spring arrangements are in equilibrium. The equilibrium, however, is unstable because any movement of the member 22 within the member 23 will allow the struts 29, 30 to expand and allow the springs 33 to do work in assisting the movement and the assistance thus given by the springs 33 is the same whether the member 22 moves to the left or right in Figure 4. When the device has been connected to the brake mechanism in a motor car, when the brakes are applied, the member 22 is drawn to the right in Figure 4 and the force exerted by the springs 33 along the axis of the member 22 assists in applying the brakes. It is arranged that the struts 29, 30 reach the position at right angles to the axis of the members 22, 23 just at about the time that the braking surfaces come into contact. When the brakes are released, the force exerted by the strained parts and the retracting springs overcome the effect of the springs 33 so that the struts 29, 30 are pushed back so that their axes are inclined to the axis of the members 22, 23 in the opposite direction. The effect of the springs 33 is then cancelled by introducing between a shoulder 41 on the member 22 and the bottom of the fork 24, a suitable compensating compression spring 42 of such a length that it operates for only that part of the movement. Since the range of movement of the left hand or compensated side of the centre line in Figure 4 is usually much less than that required on the other side, the relation between the force and displacement for such limited movement is so nearly linear that a compensating spring can be chosen which will almost exactly balance and neutralise the forces exerted by the springs 33. The range of movement at zero force thus provided allows latitude for the braking surfaces to be drawn amply clear when the brake operating mechanism is in the off position.

In order to facilitate the fitting of the mechanism shown in Figure 4 to a motor vehicle, a locking pin A is fitted to the casing 24. This pin has a cylindrical surface which engages in a corresponding groove in the member 22 so that the latter is locked in the position shown in Figure 4, with the struts at right angles to the member 22. That is to say, the pin holds the mechanism in the position which it takes up at or about the moment when the brake surfaces come into contact but before they have been forced together, the pin preventing the mechanism from going over to the brake-applying side of the dead-centre. After the mechanism is fitted to a vehicle, the pin A is turned about its axis so as to bring a flat surface, formed on the pin, opposite the groove in the member 22 so that the pin no longer engages the member 22 and the latter is free to be moved axially. The pin is locked in this position by a cotter pin.

Figure 6 shows diagrammatically a modification of the form of construction shown in Figures 4 and 5. In Figure 6, the fixed member 23 is in the form of a T-piece and two levers or links 43 are pivoted to the ends of the cross bar 44 of this T-piece. The free ends of the levers 43 are connected together by one or more tension springs 45 and the levers 43 are adapted to press on to two rigid struts 46 which are articulated and disposed in the same way as the extendible struts 29 and 30 in Figure 4. In this case also the part forming the joint between the struts 46 and the moving member 22 engages the compensating spring 42 as soon as the struts 46 have passed from the position shown through the dead centre when they are at right angles to the axis of the member 22. In other respects, this form of construction operates the same as that shown in Figures 4 and 5.

Figure 10:
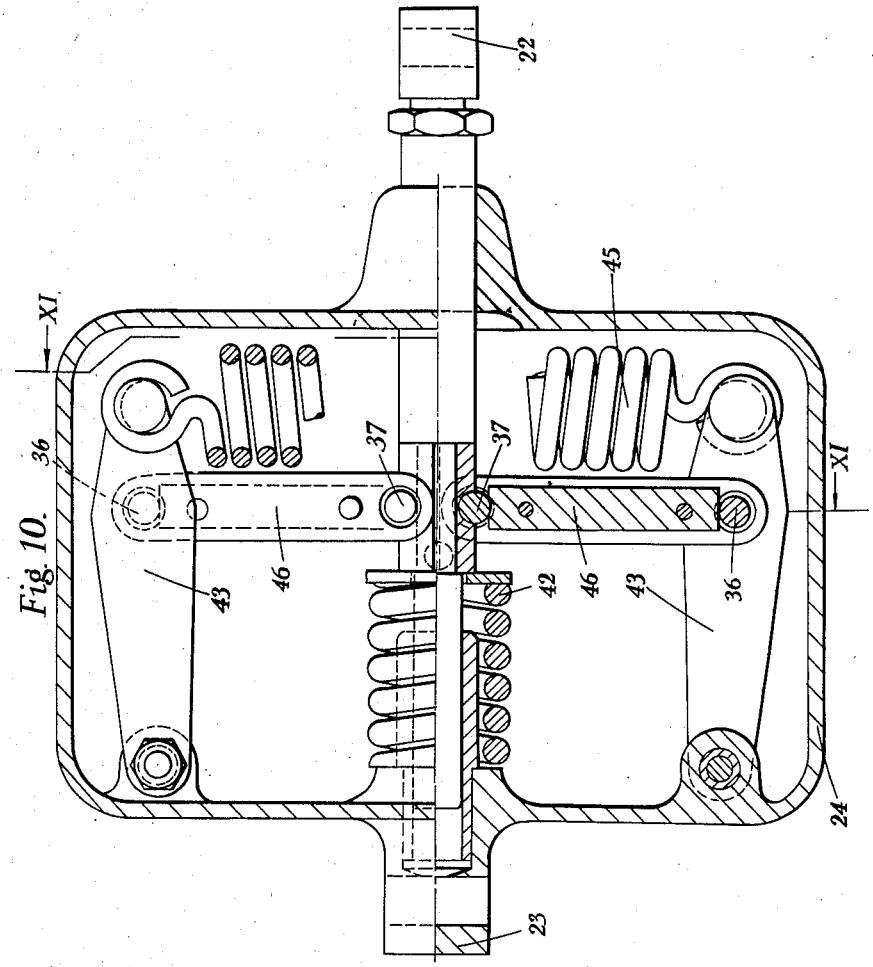
Figure 10 is a sectional side elevation of part of the mechanism shown diagrammatically in Figure 6.
Figure 11:
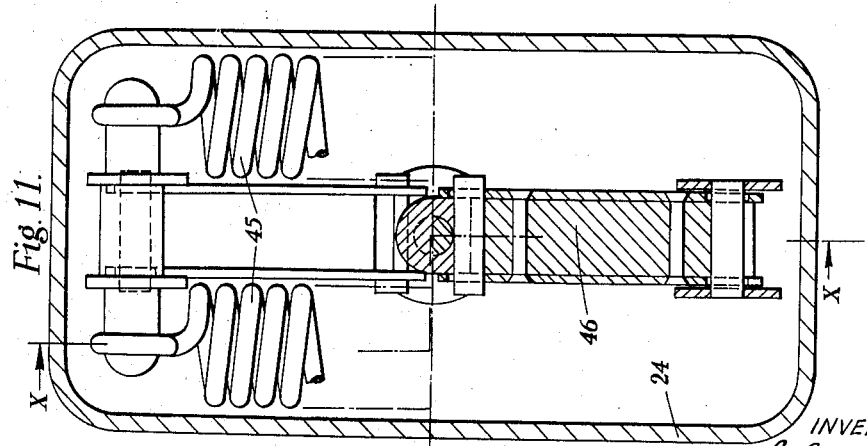
Figure 11 is a cross section on the line XI—XI in Figure 10, the latter being a section substantially on the line X—X in Figure 11.

The mechanism of Figure 6 is shown in greater detail in Figures 10 and 11. In the last mentioned figures the T-piece is provided by the anchoring member 23 and the casing 24, to which the member 23 is fixed. There are two main springs 45, as seen in Figure 11, located respectively in vertical planes on each side of and parallel with the plane in which the struts 46 swing. These struts have hardened plane surfaces which bear against hardened steel cylindrical members 36 and 37, the cylindrical members 37 being mounted in the same way as the equivalent members 37 in the construction of Figure 4. The cylindrical members 36 are fixed to the levers 43. The struts are shown in their dead centre positions in Figures 10 and 11. In this position the compensating spring 42 is completely relaxed and is in effect when the struts 46 are on the side of their dead centre position shown in Figure 6. On the other side of the dead centre position the spring 42 is compressed so as to counteract the turning moment of the struts 46 due to the springs 45.

In a further form of construction shown in Figure 7, the brake operating gear 13, 14 is formed integral with a lever 47, both being pivoted to the frame of the vehicle at 15. An extendible strut shown at 48 similar to the struts 29, 30, 33 in Figures 4 and 5 is pivoted to the right hand end of the lever 47 and at its other end is pivoted to the vehicle frame at 49. Here also the lever 47 is in the dead centre position shown in Figure 7 just as the brake surfaces are brought into contact. On depressing the pedal 14, the brakes are further applied and the strut 48 is inclined above the dead centre position and its thrust therefore assists the application of the brakes. When the brakes are released, the restoring forces overcome the spring strut 48 which is returned below the dead centre position shown in Figure 7, in which position the force exerted by the spring strut 48 is compensated and neutralised by the compensating compression spring 42 which acts between a fixed bracket 52 and a collar 50 on a rod 51 attached to the junction of the lever 47 and spring 48.

The construction shown in Figure 8 is similar to that shown in Figure 7, except that the strut 48 instead of being pivoted directly to the frame of the vehicle 49 is pivoted to a link 53 which can be adjusted by a bolt 54 about the axis of oscillation of the lever 47 at 15. In this way the operative range of the device can be shifted to accommodate displacement of the brake operating gear 13 due to wear. Similarly, an adjustment may be provided in the length of either the moving member 22 or the fixed member 24 in Figures 4 and 5 for the same purpose.

The construction of Figure 8 is shown in greater detail in Figures 12 and 13. Referring to those figures it will be seen that the spring loaded strut 48 (similar to the struts 29, 30, 33 of Figures 4 and 5) is pivoted at one end 49 to the link 53, which is pivoted about a fixed axis 15 to the frame of the vehicle and is normally held in any predetermined position in accordance with the setting of the bolt 54, which passes through a nut (49a) which is pivotally mounted at the right hand end of the link 53. The other end of the strut 48 is pivoted to a lever 47 on the brake applying lever 13. In Figures 12 and 13 the strut 48 is shown in its dead centre position. When the lever 13 is depressed so as to lift the left hand end of the strut, the spring expanding the strut assists in forcing the brake pads against their drums. When the strut is on the other side of the dead centre position, the force of the expanding spring is counteracted by the compression spring 42, which bears at one end against the fixed bracket 52 and at the other end against the collar 50 on the rod 51, which is pivoted to the lever 47 and passes through a pivotally mounted bush 52a.

Finally, in Figure 9, the extendible strut 48 shown in Figures 7 and 8 is replaced by a tension spring 55, the remaining parts are numbered as in Figures 7 and 8 and it will be seen that in Figure 9 the mechanism is shown in the position with the brake applied and the spring 55 assisting the application of the brake. When the brake is released the right hand end of the lever 47 is moved down below the dead centre position and then the pull of the spring 55 is compensated and neutralised by the spring 42 as in Figures 7 and 8.

Pivotal joints embodying hardened steel surfaces arranged to roll on hardened cylindrical surfaces, as employed in the construction of Figures 4 and 5, may be used in other embodiments of the invention as, for example, that of Figures 1 and 2.

The functioning of the mechanism previously described can be explained with reference to Figures 14 and 15 which show diagrammatically the rear part of a mechanical automobile brake system. The rear brake drums 100 contain brake pads 101 which, when the brakes are inoperative, are held away from the drums by springs 102. The inoperative condition of the mechanism is shown in Figure 14. The brakes are operated in the usual way by the driver pressing on a pedal 103 which is connected to the brake pads 101 by the linkage shown. This kind of linkage is, of course, well known in the art and includes a link 104 which, in conjunction with further links, transmits the braking movement and force to front brakes.

Now, when pedal 103 is depressed to apply the brakes, the action takes place in two stages, namely, stages (1) and (2) as follows:—

(1) As pedal 103 is moved from the position of Figure 14 to the position shown in full lines in Figure 15, brake pads 101 are moved into contact with drums 100, spring 102 being stretched.

(2) As pedal 103 is moved from the position shown in full lines in Figure 15 to the position shown in dotted lines in that figure, the real braking action occurs. The pressure between the braking surfaces is increased as the linkage is strained from full line position to dotted line position. It is to be particularly noted that, during this stage, the brake pads undergo substantially no further movement. They are prevented from further movement by the drums with which they are already in contact and springs 102 are stretched no further in this second stage. The strain in the linkage includes slight bending in levers 109, extension of links 110 and torsion in pivoted, transverse rods 111. The increase in pressure between the braking surfaces is simply the result of the strained linkage tending to return to its unstrained condition but being prevented from so doing by the engagement of brake pads 101 with brake drum 100, at one end, and the force exerted by driver's foot on pedal 103 at the other end.

When the driver relaxes his pressure on pedal 103, the linkage becomes unstrained while the pressure between the brake surfaces decreases, and it is only when the strain in the linkage has almost completely disappeared that springs 102 are able to return pads 101 to the positions shown in Figure 14. It is only during the aforementioned stage (2) that the applicant's mechanisms are arranged to assist the driver. One such mechanism is shown very diagrammatically in Figures 14 and 15, and includes a main spring 105 equivalent to the springs 1, 33, 45, 48 and 55 in the mechanisms of Figures 1 to 13. The spring is a compression spring and acts at one end on an extension 107 of the pedal lever. It is pivoted at the other end about a fixed axis on a line XY containing the pivot of the pedal lever. When the lever 103 is moved from position of Figure 14 to full line position in Figure 15, the main spring 105 is compressed and reaches its dead centre position when said full line position is reached. Thereafter, the spring 105 expands and assists the driver. The compression of the spring 105 would necessitate considerable initial effort on the part of the driver. This effort required initially to move the pedal 103 would decrease as the dead centre position is reached and, in addition to imposing a strain on the driver, would result in jerky brake operation. However, a secondary or compensating compression spring 106, acting between a fixed abutment 108 and extension 107, is provided. This secondary spring is, of course, equivalent to the compensating or secondary springs 17 or 42 in Figures 1 to 13 and partially or wholly balances the resistance of main spring 105 while pedal 103 is moved from position of Figure 14 to full line position in Figure 15, so that the driver experiences little or no resistance due to spring 105 during stage (1). When the dead centre position is reached, secondary spring 106 is completely relaxed so that it does not follow extension 107 beyond the dead centre position and the servo action is provided only by the spring 105, which, although it relaxes during stage (2), acts on an increasing moment arm giving precisely the increasing force effort necessary to relieve the driver of much of the effort necessary to strain the linkage in stage (2).

Now it is to be noted, that during stage (2) the force straining the linkage, to increase the pressure between the braking surfaces, is supplied both by the force of the driver's foot upon the pedal and by the relaxing servo spring 105. Actually the servo spring provides the major part of the force in any position of the pedal during stage (2). In this second stage the stress in the strained linkage is, in all positions, balanced exactly by the sum of the force due to the servo spring and the force due to the driver. However, the stress in the strained linkage is always somewhat greater than that part of the applied force which is due to the servo spring. Accordingly, immediately the driver releases his pressure on the brake pedal, the strained linkage is able to overcome spring 105 and compress it while returning it to the dead centre position. It is not the brake springs 102 which return the brake towards the dead centre position but the stress due to the strain in the linkage.

I claim:

1. A mechanism for assisting the engagement of two-frictionally-engaging parts comprising a main elastic member, a support therefor comprising a pair of levers adapted to be actuated thereby and to have imposed thereon a force which becomes effective when said levers are moved to one side or the other of a dead centre position, the moment arm of said levers increasing as the movements of said levers from dead centre positions increase, a secondary compensating elastic member adapted to oppose and compensate for the effect of said main elastic member, a pair of pivoted arms cooperating with said secondary member, said pair of levers being adapted to remain out of contact with said arms on one side of the dead centre position and to come into contact with said pivoted arms and to strain the second elastic member substantially only when said levers are moved to the other side of their dead centre positions on which the moment produced on that side of the dead centre position is not required.

2. A mechanism for assisting the engagement of two frictionally-engaging parts comprising a main elastic member, a support therefor comprising a pair of levers adapted to be actuated thereby and to have imposed thereon a force which becomes effective when said levers are moved to one side or the other of a dead centre position, the moment arm of said levers increasing as the movements of said levers from dead centre positions increase, a secondary compensating elastic member adapted to oppose and compensate for the effect of said main elastic member, a pair of pivoted arms cooperating with said secondary member, said pair of levers being adapted to remain out of contact with said arms on one side of the dead centre position and to come into contact with said pivoted arms and to strain the secondary elastic member substantially only when said levers are moved to the other side of their dead centre positions on which the moment produced on that side of the dead centre position is not required, said main elastic member and said secondary compensating member being so proportioned that the increasing force effort due to the second elastic member as the latter is strained is substantially balanced by a decreasing force effort due to the main elastic member throughout the whole effective range of said secondary elastic member.

3. A mechanism for assisting the engagement of two frictionally-engaging parts comprising at least one extendible strut, a main elastic member having a dead centre position and adapted to apply an extending force to said strut to exert a thrust thereto when it is moved to one side or the other of its dead centre position, and a secondary compensating elastic member adapted to oppose and compensate the thrust exerted by said strut substantially throughout its whole range of movement on one side of its dead centre position on which the thrust is not required and to cease acting on said strut substantially at the dead centre position so that said strut is completely free from said second elastic member on the other side of said dead centre position.

4. A braking arrangement for a vehicle including a mechanism adapted to supplement the operation of the braking linkage by the normal operating forces imposed thereupon, said mechanism having a dead centre position and comprising a main elastic member adapted to exert a force on the braking linkage to assist the application of the brakes when said member is moved to one side of its dead centre position, and a secondary compensating elastic member adapted to remain inoperative substantially throughout the range of movement of said member on said side of the dead centre position and to oppose the force exerted by said main elastic member when the brakes are released and when said first-mentioned member passes to the other side of its dead centre position, said main elastic member being so adjusted that it reaches its dead centre position at about the initiation of the contacting of the braking surfaces.

5. A braking arrangement for a vehicle including a mechanism adapted to supplement the operation of the braking linkage by the normal operating forces imposed thereupon, said mechanism having a dead centre position and comprising a main elastic member adapted to exert a force on the braking linkage to assist the application of the brakes when said member is moved to one side of its dead centre position, and a secondary compensating elastic member adapted to remain inoperative substantially throughout the range of movement of said member on said side of the dead centre position and to oppose the force exerted by said main elastic member when the brakes are released and when said first-mentioned member passes to the other side of its dead centre position, and the increasing force effort of the resistance due to the straining of the members of the brake mechanism through which the brake applying force is transmitted is substantially balanced by a decreasing force effort exerted by the main elastic member.

6. A mechanism for assisting the engagement of two frictionally-engaging parts comprising a main elastic member, a linkage adapted to be actuated thereby and to have imposed thereon a force which becomes effective when said linkage is moved to one side or the other of a dead centre position, said linkage including a plurality of articulated struts having pivotal joints constituted by hardened plane surfaces adapted to roll on hardened cylindrical surfaces and to remain in contact with said cylindrical surfaces throughout the actuation of said mechanism, and a secondary compensating elastic member adapted to oppose and compensate for the effect of said main elastic member when said linkage is moved to one side of the dead centre position in which the action of the main elastic member is not required to be utilized.

7. A mechanism for assisting the engagement of two frictionally-engaging parts comprising one extendible strut, pivotal joints at the ends thereof constituted by hardened plane surfaces adapted to roll on members cooperating therewith, said joints being disposed to permit the strut to swing freely in directions transverse to the axis of the strut, a main elastic member adapted to apply an extending force to said strut to exert a transverse thrust thereto when it is moved to one side or the other of its dead centre position, and a secondary compensating elastic member adapted to oppose and compensate the thrust exerted by said strut when it is moved to the one side of its dead centre position on which the thrust is not required, said secondary elastic member being inoperative on said strut substantially throughout the range of movement on the other side of the dead centre position.

8. A mechanism for assisting the engagement of two frictionally-engaging parts comprising a pair of oppositely arranged extendible struts having a coaxial relationship in a dead centre position thereof, an axially slidable member supporting said struts, pivotal joints at the ends of the struts constituted by hardened plane surfaces adapted to roll on cylindrical surfaces cooperating therewith, main elastic members on said extendible struts adapted to apply an extending force to said struts to exert a thrust on said slidable member when moved to one side or the other of their dead centre positions, and a secondary compensating elastic member on said axially slidable member adapted to oppose and compensate the thrust exerted by said struts when they are moved to one side of their dead centre positions on which the thrust is not required, said secondary elastic member being inoperative on said struts substantially throughout the range of movement on the other side of the dead centre position.

9. Mechanism for assisting the engagement of two frictionally-engaging parts, comprising in combination a pivotally mounted member for connection to one of said parts, an operating member operatively connected to said pivotally mounted member so as to impart rocking movement thereto, a main elastic element connected to said pivotally mounted member and operative to exert a turning moment thereon in one direction when said pivotally mounted member is rocked to one side of an intermediate position and to exert a turning moment in the opposite direction when said pivotally mounted member is rocked to the other side of said intermediate position, and a secondary elastic element mounted to counteract the turning moment of said main elastic element only when said pivotally mounted member is on one side of the said intermediate position, said main elastic element exerting pressure between the two parts independently of said secondary elastic element when said pivotally mounted member is on the other side of said intermediate position.

10. A braking arrangement including a mechanism adapted to supplement the operation of the braking linkage by the normal operating forces imposed thereupon, said mechanism having a dead centre position and comprising a main elastic member adapted to exert a force on the braking linkage to assist the application of the brakes when said member is moved to one side of its dead centre position, and a secondary compensating elastic member adapted to oppose the force exerted by said main elastic member when the brakes are released and when said first-mentioned member passes to the other side of its dead centre position and to exercise no effect when said main elastic member is on said first-mentioned side of its dead centre position.

11. A braking arrangement including a mechanism adapted to supplement the operation of the braking linkage by the normal operating forces imposed thereupon, said mechanism having a dead centre position and comprising a main elastic member adapted to exert a force on the braking linkage to assist the application of the brakes when said member is moved to one side of its dead centre position, and a secondary compensating elastic member adapted to oppose the force exerted by said main elastic member when the brakes are released and when said first-mentioned member passes to the other side of its dead centre position, said main elastic member being so adjusted that it reaches its dead centre position at about the initiation of the contacting of the braking surfaces and said second compensating elastic members adapted to be disabled beyond the point of initiation of the contacting of the braking surfaces.

12. A braking arrangement for a vehicle including a mechanism adapted to supplement the operation of the braking linkage by the normal operating forces imposed thereupon said mechanism having a dead centre position and comprising a main elastic member adapted to exert a force on the braking linkage to assist the application of the brakes when said member is moved to one side of its dead centre position, and a secondary compensating elastic member adapted to oppose the force exerted by said main elastic member when the brakes are released and when said first-mentioned member passes to the other side of its dead centre position while exercising no effect when said main elastic member is on said first mentioned side of its dead centre position, and the increasing force effort of the resistance due to the straining of the members of the brake mechanism through which the brake applying force is transmitted is substantially balanced by a decreasing force effort exerted by the main elastic member.

13. In friction braking apparatus, in combination, a pivoted device mounted for motion in one direction while the brake is being engaged and in the other direction while the brake is being released, a main elastic member organized, during said first-mentioned motion, first to exert a decreasing turning moment in one direction on said pivoted member and immediately thereafter an increasing turning moment in the opposite direction for assisting in increasing the pressure between the braking surfaces, and a secondary elastic member having one end operative to follow said pivoted device substantially until the beginning of said increasing turning moment, while substantially balancing said decreasing turning moment, said pivoted device being organized to lie beyond the range of action of said secondary elastic member substantially so long as said increasing turning moment obtains.

14. Mechanism for assisting the engagement of two frictionally engaging parts comprising in combination, an operating member for connection to one of the parts and mounted for to-and-fro movement, a pivotally-mounted member connected to swing in phase with the movement of said operating member, a main elastic element connected to said pivotally-mounted member and adapted to be progressively strained while operative to exert a turning moment in one direction on said pivotally mounted member, as the latter undergoes an initial movement from one end of its range of movement to an intermediate position, and to relax while operative to exert a turning moment in the opposite direction on said pivotally mounted member, as the latter undergoes further movement from the intermediate position to the other end of its range, and a secondary spring organized to relax while acting on the system comprising said operating member and said pivotally mounted member to oppose said first-mentioned turning moment substantially throughout the whole of said initial movement, said system being organized to move beyond the range of action of said secondary spring substantially when said intermediate position is reached and to remain beyond that range throughout said further movement.

GEORGE CARWARDINE.